US012105064B2

(12) United States Patent
Tanaka et al.

(10) Patent No.: US 12,105,064 B2
(45) Date of Patent: Oct. 1, 2024

(54) SUPPRESSOR DEVICE FOR ION CHROMATOGRAPH

(71) Applicant: SHIMADZU CORPORATION, Kyoto (JP)

(72) Inventors: Hiroshi Tanaka, Kyoto (JP); Mikoto Taki, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 297 days.

(21) Appl. No.: 17/788,762

(22) PCT Filed: Apr. 27, 2020

(86) PCT No.: PCT/JP2020/018034
§ 371 (c)(1),
(2) Date: Jun. 24, 2022

(87) PCT Pub. No.: WO2021/140686
PCT Pub. Date: Jul. 15, 2021

(65) Prior Publication Data
US 2023/0028078 A1 Jan. 26, 2023

(30) Foreign Application Priority Data

Jan. 8, 2020 (JP) .................................. 2020-001668

(51) Int. Cl.
*G01N 30/32* (2006.01)
*B01D 15/36* (2006.01)
(Continued)

(52) U.S. Cl.
CPC ........... *G01N 30/32* (2013.01); *B01D 15/361* (2013.01); *B01D 61/46* (2013.01); *B01D 61/54* (2013.01);
(Continued)

(58) Field of Classification Search
None
See application file for complete search history.

(56) References Cited

U.S. PATENT DOCUMENTS

2009/0211980 A1 8/2009 Liu et al.
2009/0289009 A1 11/2009 Liu et al.
(Continued)

FOREIGN PATENT DOCUMENTS

EP 2255180 B1 * 12/2014 ............. G01N 30/64
JP 2011-513707 A 4/2011
(Continued)

OTHER PUBLICATIONS

Borman, S. "Eluent, Effluent, Eluate, and Eluite", Analytical Chemisty, vol. 59, No. 2, Jan. 15, 1987, pp. 99A.*
(Continued)

*Primary Examiner* — Daniel S Larkin
(74) *Attorney, Agent, or Firm* — Renner, Otto, Boisselle & Sklar, LLP

(57) ABSTRACT

A suppressor device for an ion chromatograph is provided between a separation column and a detector of an ion chromatograph. An electrodialysis suppressor includes a first flow path to which an eluate flowing from the separation column is supplied, a second flow path to which a regeneration liquid is supplied, an ion exchange membrane provided between the first flow path and the second flow path and an electrode to which a voltage is applied. A power supply circuit that applies a voltage to the electrode is turned off in a case in which an eluate is not supplied to the first flow path of the electrodialysis suppressor.

14 Claims, 6 Drawing Sheets

(51) Int. Cl.
  B01D 61/46 (2006.01)
  B01D 61/54 (2006.01)
  G01N 30/02 (2006.01)
(52) U.S. Cl.
  CPC ............... *G01N 2030/027* (2013.01); *G01N 2030/326* (2013.01); *G01N 2030/328* (2013.01)

(56) References Cited

U.S. PATENT DOCUMENTS

| | | |
|---|---|---|
| 2011/0174737 A1 | 7/2011 | Liu et al. |
| 2013/0256232 A1 | 10/2013 | Liu et al. |
| 2013/0259750 A1 | 10/2013 | Liu et al. |
| 2018/0252688 A1 | 9/2018 | Srinivasan et al. |

FOREIGN PATENT DOCUMENTS

| | | |
|---|---|---|
| JP | 2018-146583 A | 9/2018 |
| WO | 2016/098260 A | 6/2016 |

OTHER PUBLICATIONS

Office Action in corresponding Chinese Patent Application No. 202080091806.X dated Sep. 2, 2023, with English machine translation.
International Search Report for corresponding Application No. PCT/JP2020/018034, mailed Aug. 4, 2020.
Written Opinion of the International Searching Authority for corresponding International Patent Application No. PCT/JP2020/018034, English Machine translation.
Office Action in corresponding Chinese Patent Application No. 202080091806.X dated May 28, 2024, with English machine translation.

* cited by examiner

FIG. 4

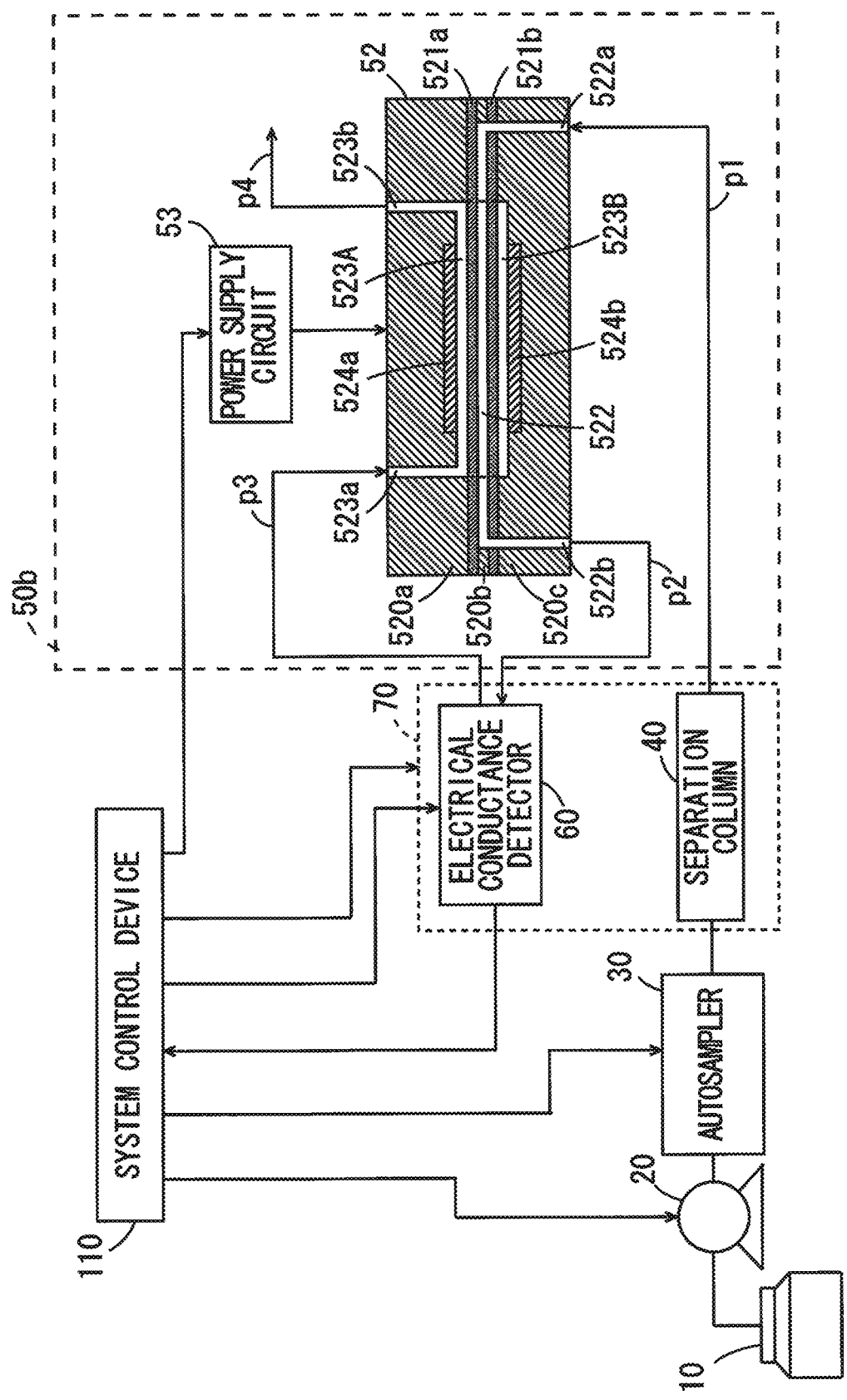
FIG. 6 - Related Art

SUPPRESSOR DEVICE FOR ION CHROMATOGRAPH

CROSS-REFERENCE TO RELATED APPLICATIONS

This application is the National Stage Entry of International Application No. PCT/JP2020/018034, filed Apr. 27, 2020, which claims the benefit of Japanese Patent Application No. 2020-001668 entitled "Suppressor Device for Ion Chromatograph," filed Jan. 8, 2020, the disclosure of which is incorporated by reference in its entirety.

Technical Field

The present invention relates to a suppressor device for an ion chromatograph.

BACKGROUND ART

A suppressor ion chromatograph includes a suppressor, which removes ions mainly constituting an eluate by ion exchange reaction, at a position farther downstream than a separation column. For example, in an ion chromatograph described in Patent Document 1, a pump is used to guide an eluent and a sample injected by a sample injector to a separation column, an electrodialysis suppressor and a detector. The sample in an eluate pressurized by the pump is separated into components by the separation column. An eluate including a sample that has been separated into components is guided to the electrodialysis suppressor.

The electrodialytic suppressor includes an eluate flow path, an electrode liquid flow path and an ion exchange membrane. The eluate flow path and the electrode liquid flow path are separated by the ion exchange membrane. An eluate that has passed through the separation column passes through the eluate flow path of the electrodialysis suppressor to be guided to the detector.

When an eluate passes through the eluent flow path and the electrode liquid flow path of the electrodialysis suppressor, ions mainly constituting the eluate in the eluate flow path move into an electrode liquid in the electrode liquid flow path via the ion exchange membrane. Thus, the electrodialytic suppressor can reduce the background of detection of an electrical conductance by removing the ions mainly constituting the eluate prior to introduction into the detector.

[Patent Document 1] WO 2016/098260 A1

SUMMARY OF INVENTION

Technical Problem

However, when electricity is distributed with an eluate staying in the electrodialysis suppressor, Joule heat caused by electricity distribution is not cooled by a flow of the eluate. Therefore, the temperature in the electrodialytic suppressor increases. Thus, the ion concentration of an eluate staying in the electrodialysis suppressor increases excessively. Therefore, the structures in the electrodialytic suppressor may be deteriorated or damaged.

An object of the present invention is to provide a suppressor device for an ion chromatograph in which deterioration and damage caused by stay of an eluate are prevented.

Solution to Problem

A suppressor device for an ion chromatograph according to one aspect of the present invention is provided between a separation column and a detector of an ion chromatograph, and includes an electrodialysis suppressor that includes a first flow path to which an eluate flowing from the separation column is supplied, a second flow path to which a regeneration liquid is supplied and an ion exchange membrane provided between the first flow path and the second flow path and an electrode to which a voltage is applied, and a power supply circuit that applies a voltage to the electrode, wherein the power supply circuit is turned off in a case in which an eluate is not supplied to the first flow path of the electrodialysis suppressor.

Advantageous Effects of Invention

The present invention enables provision of a suppressor device for an ion chromatograph in which deterioration and damage caused by stay of an eluate are prevented.

BRIEF DESCRIPTION OF THE DRAWINGS

FIG. 4 is a diagram showing the configuration of an ion chromatograph including a suppressor device according to a fourth embodiment.

FIG. 6 is a diagram showing the configuration of an ion chromatograph including a suppressor device according to a comparative example.

DESCRIPTION OF EMBODIMENTS

(1) First Embodiment

Figure 1:
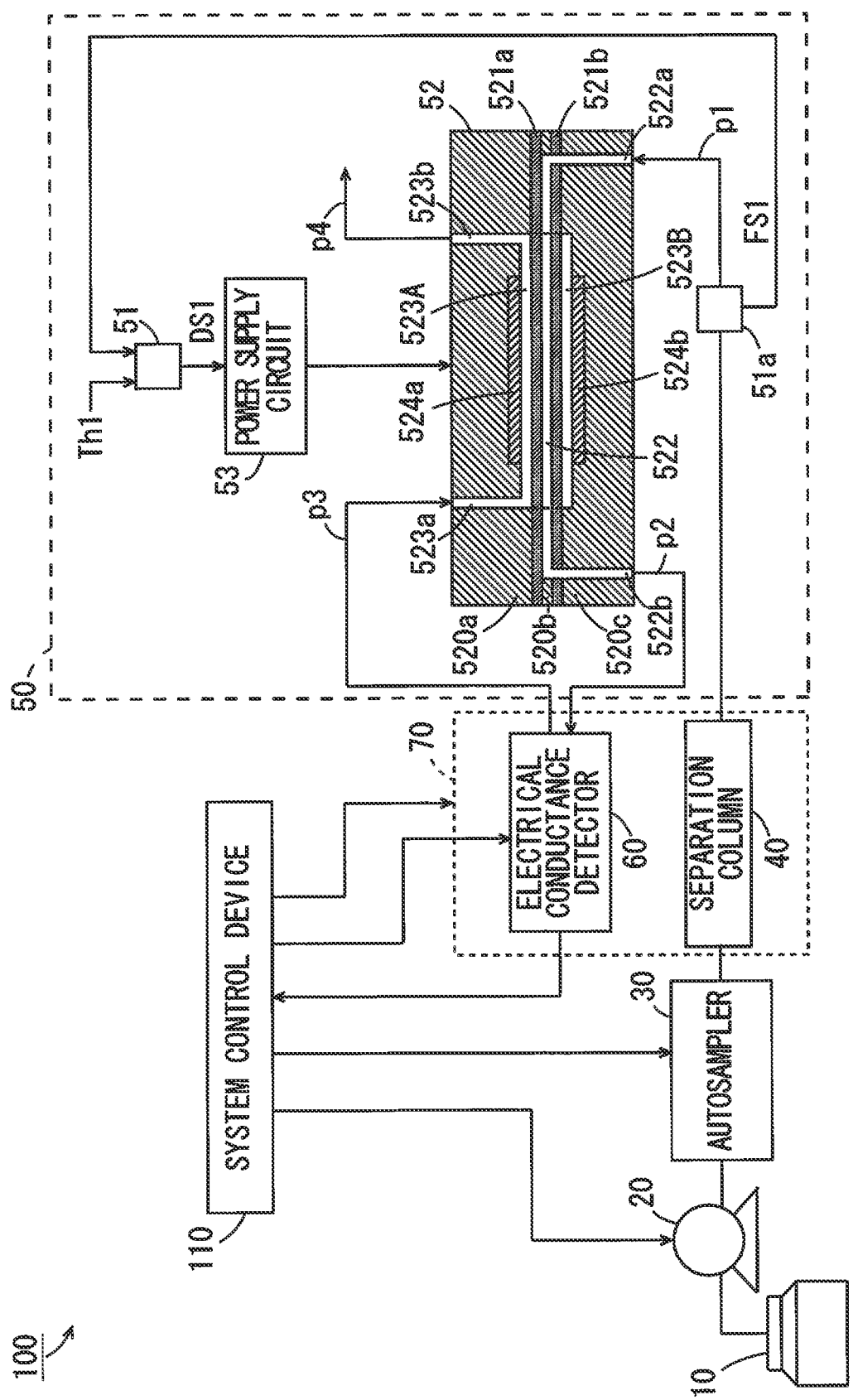
FIG. 1 is a diagram showing the configuration of an ion chromatograph including a suppressor device according to a first embodiment.

FIG. 1 is a diagram showing the configuration of an ion chromatograph including a suppressor device according to a first embodiment. The ion chromatograph 100 of FIG. 1 includes a pump 20, an autosampler 30, a separation column 40, the suppressor device 50, an electrical conductance detector (hereinafter abbreviated as a detector) 60, a column oven 70 and a system controller 110. The separation column 40 and the detector 60 are contained in the column oven 70.

The system controller 110 controls the operations of the pump 20, the autosampler 30, the detector 60 and the column oven 70. The system controller 110 is implemented by a CPU (Central Processing Unit), a RAM (Random Access Memory), a ROM (Read Only Memory) and a storage device, for example.

The pump 20 sucks an eluent from an eluent container 10 and guides the sucked eluent to the separation column 40. The autosampler 30 introduces a sample into the eluent guided from the pump 20 to the separation column 40. Thus, the eluent and the sample are introduced into the separation column 40. The separation column 40 separates the introduced sample into components. The eluate including the sample that has been separated is led out from the separation column 40 to a flow path p1.

The suppressor device 50 includes a flow sensor 51a, a determination circuit 51, an electrodialytic suppressor 52 and a power supply circuit 53. The flow sensor 51a is provided in the flow path p1 between the separation column 40 and the suppressor 52.

The suppressor 52 includes supports 520a, 520b, 520c, ion-exchange membranes 521a, 521b and electrodes 524a, 524b. The ion exchange membranes 521a, 521 b are cation exchange membranes, for example.

The support 520c, the ion exchange membrane 521b, the support 520b, the ion exchange membrane 521a and the support 520a are stacked in this order. An eluate flow path 522 is formed in the support 520b, and an eluate inlet port 522a and an eluate outlet port 522b are provided in the support 520c. Both ends of the eluate flow path 522 respectively communicate with the eluate inlet port 522a and the eluate outlet port 522b. The flow path p1 and a flow path p2 are respectively connected to the eluate inlet port 522a and the eluate outlet port 522b.

Further, regeneration liquid flow paths 523A, 523B are formed in the supports 520a, 520c, respectively. The support 520a is provided with a regeneration liquid inlet port 523a and a regeneration liquid outlet port 523b. Both ends of the regeneration liquid flow paths 523A, 523B communicate with the regeneration liquid inlet port 523a and the regeneration liquid outlet port 523b, respectively. A flow path p3 and a flow path p4 are connected to the regeneration liquid inlet port 523a and the regeneration liquid outlet port 523b, respectively.

The electrode 524a and the electrode 524b are provided in the support 520a and the support 520c, respectively, so as to sandwich the regeneration liquid flow path 523A, the ion exchange membrane 521a, the eluate flow path 522, the ion exchange membrane 521b and the regeneration liquid flow path 523B.

An eluate led out from the separation column 40 is guided to the eluate inlet port 522a of the suppressor 52 through the flow path p1. The eluate guided into the eluate flow path 522 from the eluate inlet port 522a flows through the eluate flow path 522.

The eluate that has passed through the eluate flow path 522 is guided from the eluate outlet port 522b to the detector 60 through the flow path p2. The detector 60 detects an electrical conductance of a sample that has been separated into components. The eluate that has passed through the detector 60 is guided as a regeneration liquid to the regeneration liquid inlet port 523a of the suppressor 52 through the flow path p3.

The regeneration liquid guided from the regeneration liquid inlet port 523a into the regeneration liquid flow paths 523A, 523B flows through the regeneration liquid flow paths 523A, 523B. The regeneration liquid that has passed through the regeneration liquid flow paths 523A, 523B is discharged to the outside from the regeneration liquid outlet port 523b through the flow path p4.

The flow sensor 51a detects a flow rate of the eluate flowing through the flow path p1 and outputs a detection signal FS1 indicating the detected flow rate to the determination circuit 51. Thus, the flow rate of the eluate guided to the eluate flow path 522 is detected by the flow sensor 51a. In the present embodiment, the determination circuit 51 includes a comparison circuit.

The determination circuit 51 determines whether the flow rate indicated by the detection signal FS1 provided from the flow sensor 51a is larger than a threshold value Th1, and outputs a determination signal DS1 indicating a result of determination to the power supply circuit 53. While being 1 mL/min, for example, the threshold value Th1 is not limited to this value. The power supply circuit 53 is connected to the electrodes 524a, 524b so as to apply a voltage between the electrodes 524a, 524b.

In a case in which the flow rate indicated by the detection signal FS1 is larger than the threshold value Th1, the determination signal DS1 is in an ON state (a high logic level, for example). Conversely, in a case in which the flow rate indicated by the detection signal FS1 is equal to or smaller than the threshold value Th1, the determination signal DS1 is in an OFF state (a low logic level). When the determination signal DS1 is put in the ON state, the power supply circuit 53 is turned on. Further, when the determination signal DS1 is put in the OFF state, the power supply circuit 53 is turned off.

Thus, in a case in which the power supply circuit 53 is turned on, a voltage is applied between the electrodes 524a, 524b. Further, in a case in which the power supply circuit 53 is turned off, a voltage is not applied between the electrodes 524a, 524b.

In a case in which a voltage is applied between the electrodes 524a, 524b, an eluate in the eluate flow path 522 and a regeneration liquid in the regeneration liquid flow paths 523A, 523B are electrolyzed, and ions that are not to be analyzed and are flowing through the eluate flow path 522 are transmitted through the ion exchange membranes 521a, 521b to move to the regeneration liquid flowing through the regeneration liquid flow paths 523A, 523B. Ions to be analyzed in an eluate flowing through the eluate flow path 522 are guided to the detector 60.

In this manner, with the suppressor device 50 according to the first embodiment, in a case in which a flow rate detected by the flow sensor 51a is equal to or smaller than the threshold value Th1, a voltage is not applied to the electrodes 524a, 524b.

Therefore, a voltage is prevented from being applied with an eluate staying in the eluate flow path 522. Therefore, because Joule heat caused by power distribution is not generated, the temperature of an eluate staying in the eluate flow path 522 does not increase. Therefore, the concentration of ions in an eluate in the suppressor 52 does not increase excessively. As a result, the structures in the suppressor 52 can be prevented from being deteriorated and damaged.

Further, in a case in which a flow rate detected by the flow sensor 51a is larger than the threshold value Th1, a voltage is applied to the electrodes 524a, 524b.

Thus, a situation where a voltage is not applied when an eluate is flowing through the eluate flow path 522 does not occur. Therefore, ions in the eluate are prevented from being accumulated in the suppressor 52 without being electrodialyzed. Therefore, a period of time required to remove ions accumulated in the suppressor 52 is reduced. As a result, the baseline of a detection value by the detector 60 is stabilized in a short period of time.

(2) Second Embodiment

Figure 2:
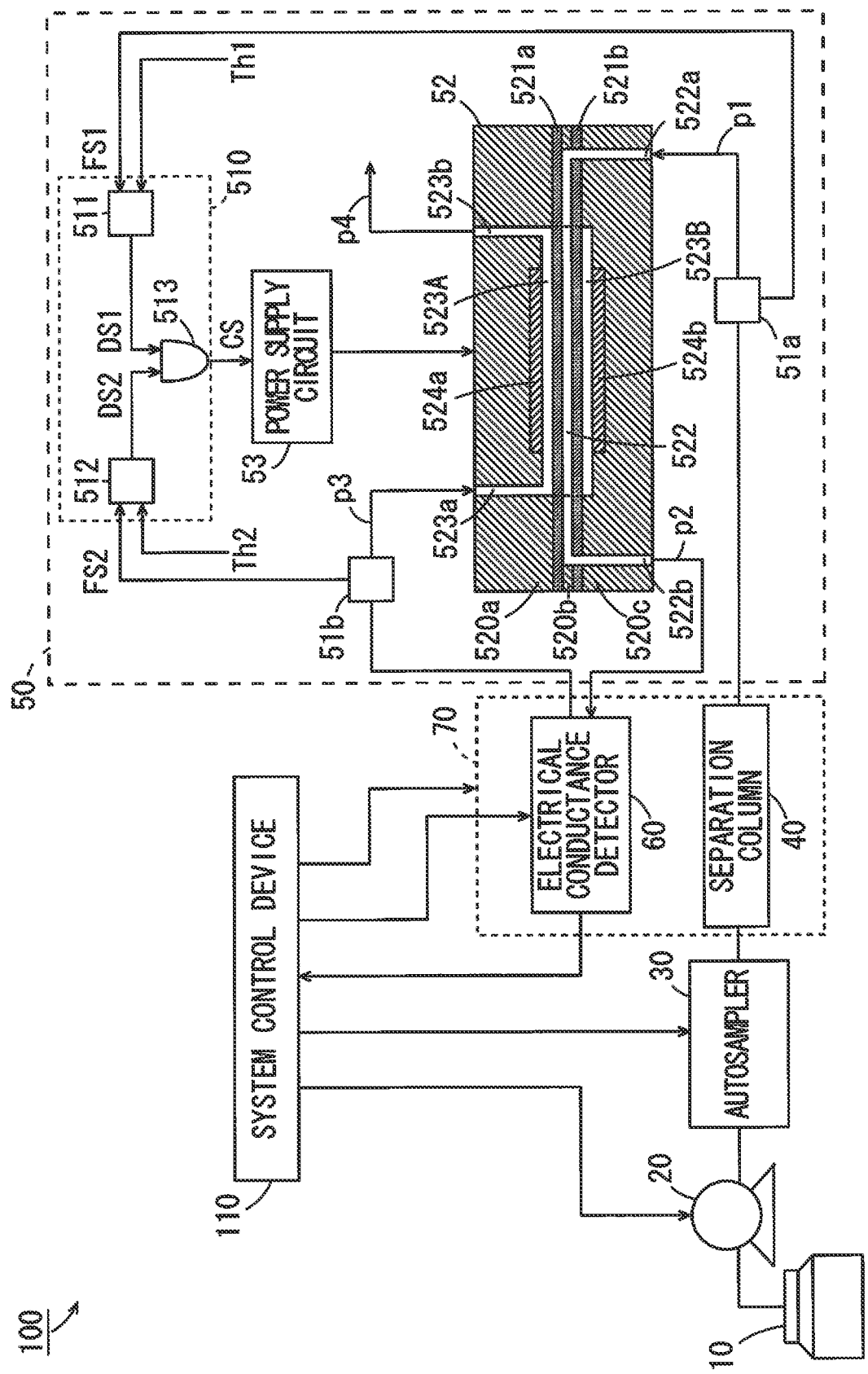
FIG. 2 is a diagram showing the configuration of an ion chromatograph including a suppressor device according to a second embodiment.

FIG. 2 is a diagram showing the configuration of an ion chromatograph including a suppressor device according to a second embodiment. The ion chromatograph 100 of FIG. 2 is different from the ion chromatograph 100 of FIG. 1 in the following points. A suppressor device 50 further includes a flow sensor 51b. Further, a determination circuit 510 is provided instead of the determination circuit 51. The determination circuit 510 includes comparison circuits 511, 512 and an AND circuit 513.

A detection signal FS1 is supplied to the comparison circuit 511 from a flow sensor 51a. The comparison circuit 511 determines whether a flow rate indicated by a detection signal FS1 is larger than the threshold value Th1 and outputs a determination signal DS1 indicating a result of determination to the AND circuit 513.

The flow sensor 51b is provided in a flow path p3 between a detector 60 and a regeneration liquid inlet port 523a of a suppressor 52. The flow sensor 51b detects the flow rate of an eluate flowing through the flow path p3 and outputs a detection signal FS2 indicating the detected flow rate to the comparison circuit 512. Thus, the flow rate of a regeneration liquid guided to the regeneration liquid flow paths 523A, 523B is detected by the flow sensor 51b.

The comparison circuit 512 determines whether the flow rate indicated by the detection signal FS2 provided from the flow sensor 51b is larger than a threshold value Th2, and outputs a determination signal DS2 indicating a result of determination to the AND circuit 513. While being 1 mL/min, for example, the threshold value Th2 is not limited to this value.

In a case in which the flow rate indicated by the detection signal FS2 is larger than the threshold value Th2, the determination signal DS2 is in an ON state (a high logic level, for example). Conversely, in a case in which the flow rate indicated by the detection signal FS2 is equal to or smaller than the threshold value Th2, the determination signal Th2 is in an OFF state (a low logic level, for example).

The AND circuit 513 calculates the AND function of the determination signal DS1 output from the comparison circuit 511 and the determination signal DS2 output from the comparison circuit 512, and supplies a determination signal CS indicating a result of calculation to the power supply circuit 53. In a case in which the determination signal DS1 and the determination signal DS2 are in the ON state, the determination signal CS is in the ON state (the high logic level, for example). Further, in a case in which at least one of the determination signal DS1 and the determination signal DS2 is in an OFF state, the determination signal CS is in the OFF state (a low logic level, for example). When the determination signal CS is put in the ON state, the power supply circuit 53 is turned on. Further, when the determination signal CS is put in the OFF state, the power supply circuit 53 is turned off.

In this manner, with the suppressor device 50 according to the second embodiment, in a case in which the flow rate detected by the flow sensor 51a is equal to or smaller than the threshold value Th1 or in a case in which the flow rate detected by the flow sensor 51b is equal to or smaller than the threshold value Th2, a voltage is not applied to the electrodes 524a, 524b.

Thus, a voltage is prevented from being applied with an eluate staying in the eluate flow path 522 or with a regeneration liquid staying in the regeneration liquid flow paths 523A, 523B. Therefore, because Joule heat caused by power distribution is not generated, the temperature of an eluate staying in the eluate flow path 522 or a regeneration liquid staying in the regeneration liquid flow paths 523A, 523B does not increase.

Therefore, the concentration of ions in an eluate and the concentration of ions in a regeneration liquid in the suppressor 52 do not increase excessively. As a result, the structures in the suppressor 52 can be prevented from being deteriorated and damaged.

Further, in a case in which the flow rate detected by the flow sensor 51a is larger than the threshold value Th1 and the flow rate detected by the flow sensor 51b is larger than the threshold value Th2, a voltage is applied to the electrodes 524a, 524b.

Thus, a situation where a voltage is not applied when an eluate and a regeneration liquid are respectively flowing through the eluate flow path 522 and the regeneration liquid flow paths 523A, 523B does not occur. Therefore, ions in the eluate are prevented from being accumulated in the suppressor 52 without being electrodialyzed. Therefore, a period of time required to remove ions accumulated in the suppressor 52 is reduced. As a result, the baseline of a value of detection by the detector 60 is stabilized in a short period of time.

(3) Third Embodiment

Figure 3:
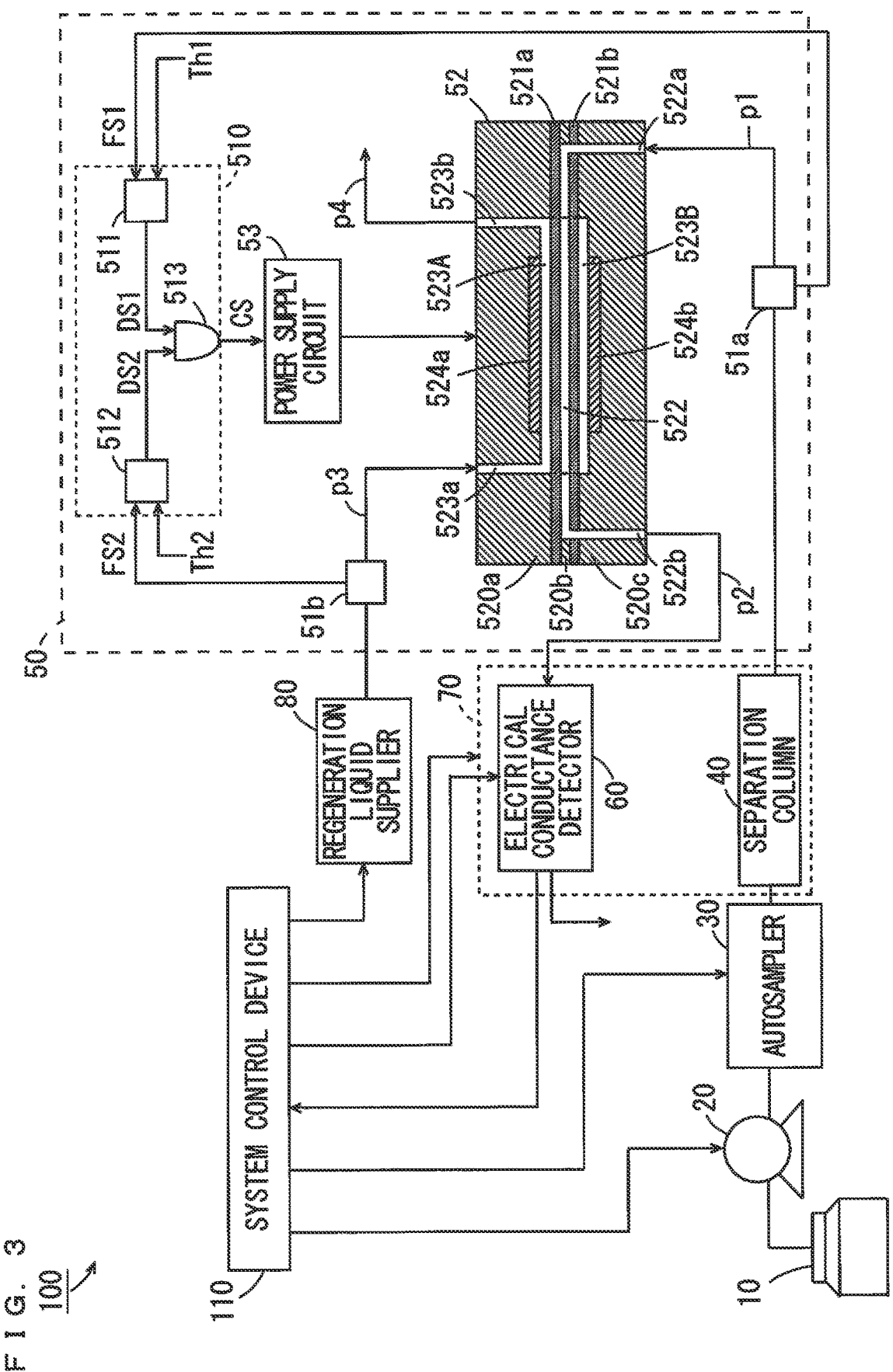
FIG. 3 is a diagram showing the configuration of an ion chromatograph including a suppressor device according to a third embodiment.

FIG. 3 is a diagram showing the configuration of an ion chromatograph including a suppressor device according to a third embodiment. The ion chromatograph 100 of FIG. 3 is different from the ion chromatograph 100 of FIG. 2 in the following points.

The ion chromatograph 100 further includes a regeneration liquid supplier 80. A system controller 110 further controls the regeneration liquid supplier 80. An eluate guided from an eluate outlet port 522b of a suppressor 52 to a detector 60 is discharged to the outside after passing through the detector 60.

The regeneration liquid supplier 80 is connected to a flow path p3. The regeneration liquid supplier 80 supplies a regeneration liquid to a regeneration liquid inlet port 523a of the suppressor 52 through the flow path p3. A regeneration liquid is water, for example. A regeneration liquid guided from the regeneration liquid inlet port 523a to regeneration liquid flow paths 523A, 523B flows through the regeneration liquid flow paths 523A, 523B. A regeneration liquid that has passed through the regeneration liquid flow paths 523A, 523B is discharged to the outside from a regeneration liquid outlet port 523b through a flow path p4.

A flow sensor 51b is provided in the flow path p3 between the regeneration liquid supplier 80 and the regeneration liquid inlet port 523a of the suppressor 52. The flow sensor 51b detects a flow rate of a regeneration liquid flowing through the flow path p3 and outputs a detection signal FS2 indicating the flow rate to a comparison circuit 512 of a determination circuit 510. Thus, the flow rate of a regeneration liquid guided to the regeneration liquid flow paths 523A, 523B is detected by the flow sensor 51b. The configuration and operation of the determination circuit 510 are similar to those of the determination circuit 510 in the second embodiment.

In this manner, with the suppressor device 50 according to the third embodiment, similarly to the suppressor device 50 according to the second embodiment, a voltage is prevented from being applied with an eluate staying in the eluate flow path 522 or with a regeneration liquid staying in the regeneration liquid flow paths 523A, 523B. As a result, the structures in the suppressor 52 can be prevented from being deteriorated and damaged.

Further, a situation where a voltage is not applied when an eluate and a regeneration liquid are respectively flowing through the eluate flow path 522 and the regeneration liquid flow paths 523A, 523B does not occur. As a result, the baseline of a value of detection by the detector 60 is stabilized in a short period of time.

(4) Fourth Embodiment

Figure 4:
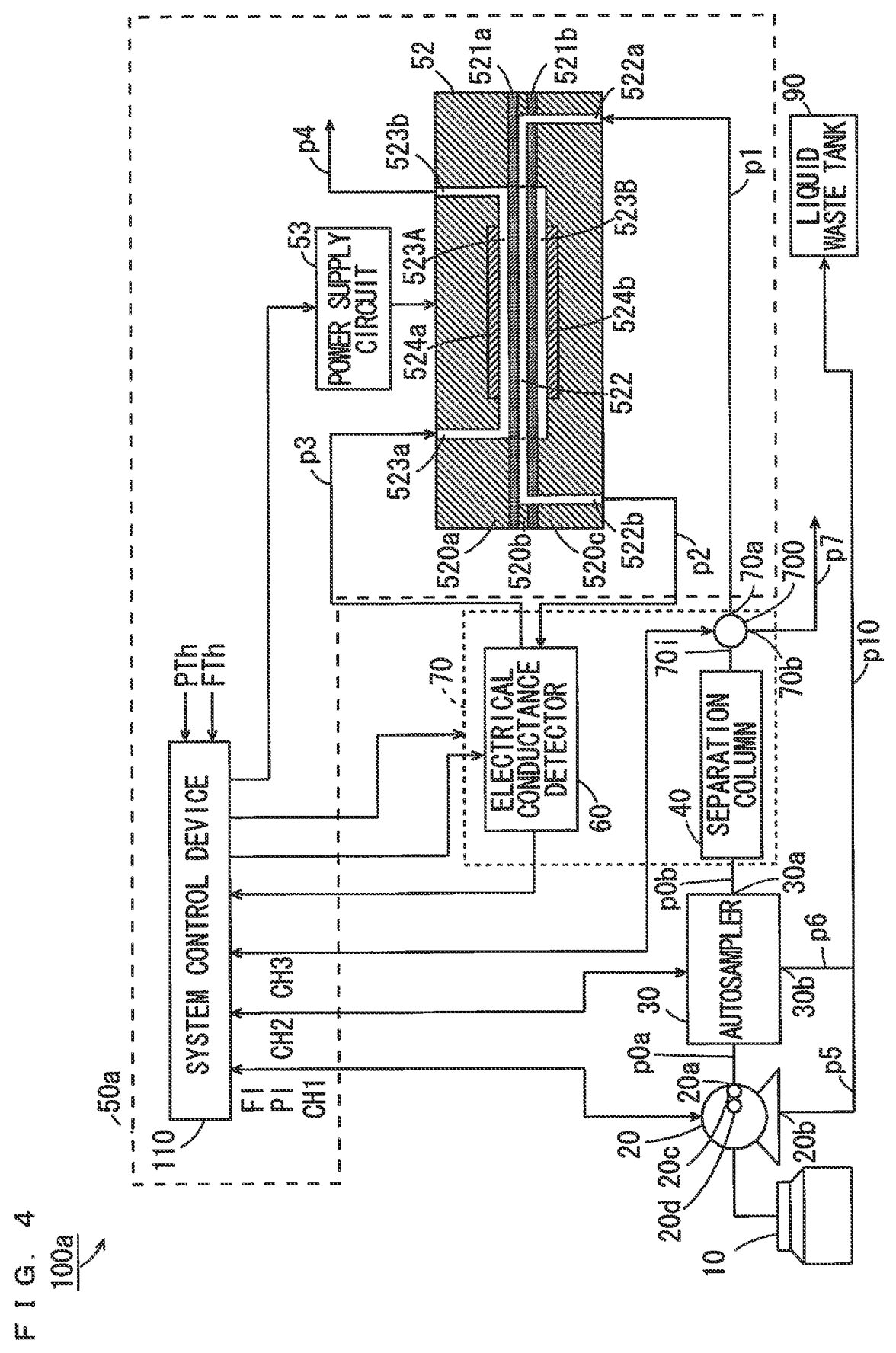

FIG. 4 is a diagram showing the configuration of an ion chromatograph including a suppressor device according to a fourth embodiment. An ion chromatograph 100a of FIG. 4 is different from the ion chromatograph 100 of FIG. 1 in the following points.

A pump 20 includes a first discharge port 20a and a second discharge port 20b. A flow path p0a is connected to the first discharge port 20a, and a flow path p5 is connected to a second discharge port 20b. The pump 20 is configured to be switchable so as to selectively discharge the eluent from any one of the first discharge port 20a and the second discharge port 20b. Here, a state in which the pump 20 discharges the eluent from the first discharge port 20a is referred to as a fifth state, and a state in which the pump 20 discharges the eluent from the second discharge port 20b is referred to as a sixth state.

In a case in which the pump 20 is in the fifth state, the eluent discharged from the first discharge port 20a is guided to an autosampler 30 through a flow path p0a. In a case in which the pump 20 is in a sixth state, the eluent discharged from the second discharge port 20b is guided to a liquid waste tank 90 through a flow path p5 and a flow path p10.

The pump 20 includes a pressure sensor 20c and a flow rate sensor 20d. The pressure sensor 20c detects the pressure of an eluent discharged from the first discharge port 20a of the pump 20. The flow rate sensor 20d detects the flow rate of an eluent discharged from the first discharge port 20a of the pump 20.

The autosampler 30 has a first lead-out port 30a and a second lead-out port 30b. A flow path p0b is connected to the first lead-out port 30a, and a flow path p6 is connected to the second lead-out port 30b. The autosampler 30 is configured to be switchable so as to selectively lead out an eluent from any one of the first lead-out port 30a and the second lead-out port 30b. Here, a state in which the autosampler 30 leads out an eluent from the first lead-out port 30a is referred to as a seventh state, and a state in which the autosampler leads out an eluent from the second lead-out port 30b is referred to as an eighth state.

In a case in which the autosampler 30 is in the seventh state, an eluent led out from the first lead-out port 30a is guided to a separation column 40 through the flow path p0b. In a case in which the autosampler 30 is in the eighth state, an eluent led out from the second lead-out port 30b is guided to a liquid waste tank 90 through a flow path p6 and a flow path p10.

A switching valve 700 is provided between the separation column 40 and an eluate inlet port 522a of the suppressor 52. The switching valve 700 has a liquid inlet port 70i, a first liquid outlet port 70a and a second liquid outlet port 70b. The liquid inlet port 70i is connected to the separation column 40. An eluate led out from the separation column 40 flows into the liquid inlet port 70i. A flow path p1 is connected to the first liquid outlet port 70a, and a flow path p7 is connected to the second liquid outlet port 70b.

The switching valve 700 is configured to be switchable such that an eluate flowing in from the liquid inlet port 70i selectively flows out from any one of the first liquid outlet port 70a and the second liquid outlet port 70b. Here, a state in which an eluate flows out from the first liquid outlet port 70a is referred to as a ninth state, and a state in which an eluate flows out from the second liquid outlet port 70b is referred to as a tenth state.

In a case in which the switching valve 700 is in the ninth state, an eluate flowing out from the first liquid outlet port 70a is guided to the eluate inlet port 522a of the suppressor 52 through the flow path p1. In a case in which the switching valve 700 is in the tenth state, an eluate flowing out from the second liquid outlet port 70b is guided to another detector (not shown) or the like through the flow path p7. The other detector is an RI (Refractive Index) detector, for example.

Here, information representing the pressure of an eluent detected by the pressure sensor 20c is referred to as pressure information PI, and information representing the flow rate of an eluent detected by the flow rate sensor 20d is referred to as flow rate information FI. Information representing whether the pump 20 is in the fifth state or the sixth state is referred to as first flow path switching information CH1. Information representing whether the autosampler 30 is in the seventh state or the eighth state is referred to as second flow path switching information CH2. Information representing whether the switching valve 700 is in the ninth state or the tenth state is referred to as third flow path switching information CH3. Further, the pressure information PI, the flow rate information FI, the first flow path switching information CH1 and the second flow path switching information CH2 are collectively referred to as first supply information. The third flow path switching information CH3 is referred to as second supply information.

The suppressor device 50a includes a system controller 110 of the ion chromatograph 100a as first and second controllers. The system controller 110 controls the pump 20, the autosampler 30, the detector 60 and the column oven 70, acquires the first supply information from the pump 20, the pressure sensor 20c, the flow rate sensor 20d and the autosampler 30, and acquires the second supply information from the switching valve 700. In detail, the system controller 110 acquires the first flow path switching information CH1 from the pump 20, acquires the pressure information PI from the pressure sensor 20c, acquires the flow rate information FI from the flow rate sensor 20d and acquires the second flow path switching information CH2 from the autosampler 30. Further, the system controller 110 acquires the third flow path switching information CH3 from the switching valve 700. The system controller 110 controls a power supply circuit 53 based on the first and second supply information.

Figure 5:
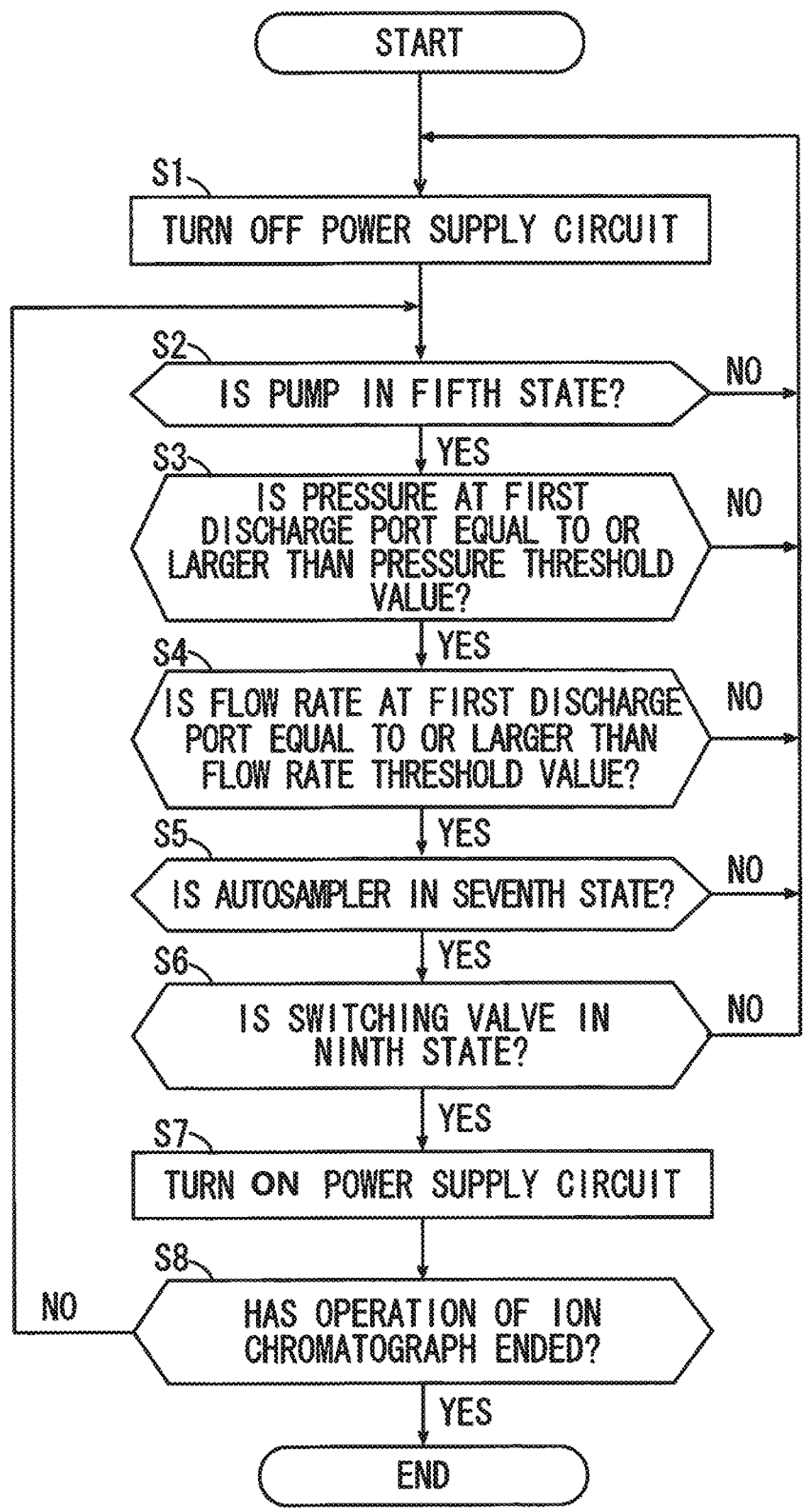
FIG. 5 is a flowchart showing one example of the control of a power supply circuit by a system controller of FIG. 4.

FIG. 5 is a flowchart showing one example of the control of the power supply circuit 53 by the system controller 110 of FIG. 4. First, the system controller 110 turns off the power supply circuit 53 (step S1).

The system controller 110 acquires the first flow path switching information CH1 from the pump 20 and determines whether the acquired first flow path switching information CH1 represents the fifth state (step S2). In a case in which the first flow path switching information CH1 represents the sixth state, the system controller 110 returns to the step S1.

In a case in which the first flow path switching information CH1 represents the fifth state, the system controller 110 acquires the pressure information PI from the pressure sensor 20c and determines whether the pressure of an eluent represented by the acquired pressure information PI is equal to or larger than a predetermined pressure threshold value PTh (step S3). In a case in which the pressure of an eluent represented by the pressure information PI is lower than the pressure threshold value PTh, the system controller 110 returns to the step S1.

In a case in which the pressure of an eluent represented by the pressure information PI is equal to or larger than the pressure threshold value PTh, the system controller 110 acquires the flow rate information FI from the flow rate sensor 20d and determines whether the flow rate of an eluent represented by the acquired flow rate information FI is equal to or larger than a predetermined flow rate threshold value FTh (step S4). In a case in which the flow rate of an eluent represented by the flow rate information FI is smaller than the flow rate threshold value FTh, the system controller 110 returns to the step S1.

In a case in which the flow rate of an eluent represented by the flow rate information FI is equal to or larger than the flow rate threshold value FTh, the system controller 110 acquires the second flow path switching information CH2 from the autosampler 30 and determines whether the acquired second flow path switching information CH2 represents the seventh state (step S5). In a case in which the second flow path switching information CH2 represents the eighth state, the system controller 110 returns to the step S1.

In a case in which the second flow path switching information CH2 represents the seventh state, the system controller 110 acquires the third flow path switching information CH3 from the switching valve 700, and determines whether the acquired third flow path switching information CH3 represents the ninth state (step S6). In a case in which the third flow path switching information CH3 represents the tenth state, the system controller 110 returns to the step S1.

In a case in which the third flow path switching information CH3 represents the ninth state, the system controller 110 turns on the power supply circuit 53 (step S7). The system controller 110 determines whether to end the operation of the ion chromatograph 100a (step S8). In a case in which not ending the operation of the ion chromatograph 100a, the system controller 110 returns to the step S2 and repeats the steps S2 to S8.

With the ion chromatograph 100a according to the fourth embodiment, in a case in which the pump 20 is in the sixth state, the autosampler 30 is in the eighth state or the switching valve 700 is in the tenth state, a new eluate is not guided to the eluate flow path 522 of the suppressor 52. In such a case, the power supply circuit 53 is turned off by the system controller 110. Thus, a voltage is not applied to the electrodes 524a, 524b of the suppressor 52.

Further, in a case in which the pressure of an eluent discharged from the first discharge port 20a of the pump 20 is lower than the pressure threshold value PTh or a case in which the flow rate of an eluent discharged from the first discharge port 20a of the pump is smaller than the flow rate threshold value FTh, a sufficient amount of eluate is not guided to the eluate flow path 522 of the suppressor 52. In such a case, the power supply circuit 53 is turned off by the system controller 110. Thus, a voltage is not applied to the electrodes 524a, 524b of the suppressor 52.

As a result, a voltage is prevented from being applied with an eluate staying in the eluate flow path 522 of the suppressor 52. Therefore, the structures in the suppressor 52 can be prevented from being deteriorated and damaged.

(5) Comparative Example

FIG. 6 is a diagram showing the configuration of an ion chromatograph including a suppressor device according to a comparative example. The ion chromatograph 100b of FIG. 6 is different from the ion chromatograph 100 of FIG. 1 in the following points.

A flow path p1 of a suppressor device 50b of FIG. 6 is not provided with a flow sensor 51a. Further, a system controller 110 further controls a power supply circuit 53. In this case, the system controller 110 starts the operation of a pump 20 and turns on the power supply circuit 53.

However, an eluate may not be guided to an eluate flow path 522 even though the pump 20 is operating. For example, in a case in which a flow path p1 is detached during cleaning of a separation column 40, etc. for some reason, when a manual purge valve (not shown) provided in a flow path p4 is closed or when an eluate is leaking from any of flow paths p1 to p4, the eluate is not supplied to the eluate flow path 522 of the suppressor 52 even though the pump 20 is operating.

Thus, because a voltage is applied between the electrodes 524a, 524b with an eluate staying in the eluate flow path 522, Joule heat generated by power distribution is not cooled by a flow of the eluate. Therefore, the temperature in the suppressor 52 increases, and the ion concentration of an eluate in the suppressor 52 increases excessively. This may deteriorate or damage the structures in the suppressor 52.

Further, in a case in which the operation of the pump 20 by the system controller 110 is out of synchronization with ON/OFF of the power supply circuit 53, a voltage may not be applied between the electrodes 524a, 524b when an eluate is flowing through the eluate flow path 522. In this case, ions in the eluate are accumulated in the suppressor 52 without being electrodialyzed. Therefore, time is spent on removing the ions accumulated in the suppressor 52. As a result, it requires time to stabilize the baseline of a value of detection by the detector 60.

In contrast, with the suppressor device 50 according to the above-mentioned first embodiment, a voltage is prevented from being applied with an eluate staying in the eluate flow path 522. As a result, the structures in the suppressor 52 can be prevented from being deteriorated and damaged.

Further, a situation where a voltage is not applied when an eluate is flowing through the eluate flow path 522 does not occur. As a result, the baseline of a value of detection by the detector 60 is stabilized in a short period of time. As described above, similar effects can be obtained in the suppressor devices 50 according to the second, third and fourth embodiments.

(6) Other Embodiments

While a determination signal DS1 is in the ON state at a high logic level and is in the OFF state at a low logic level in the above-mentioned embodiment, the present invention is not limited to this. A determination signal DS1 may be in the ON state at a low logic level and in the OFF state at a high logic level. While a determination signal DS2 is in the ON state at a high logic level and is in the OFF state at a low logic level in the above-mentioned embodiment, the present invention is not limited to this. A determination signal DS2 may be in the ON state at a low logic level and may be in the OFF state at a high logic level.

In the above embodiment, the threshold values Th1, Th2 may be set to a same value or different values in advance by a user of the ion chromatograph 100. While a determination signal CS is in the ON state at a high logic level and is in the OFF state at a low logic level in the above-mentioned embodiment, the present invention is not limited to this. A determination signal CS may be in the ON state at a low logic level and may be in the OFF state at a high logic level.

While the ion exchange membrane 521a and the ion exchange membrane 521b are cation exchange membranes in the above-mentioned embodiment, the present invention is not limited to this. The ion exchange membrane 521a and the ion exchange membrane 521b may be anion exchange membranes.

In the above embodiment, the pressure threshold value PTh and the flow rate threshold value FTh may be set by a user of the ion chromatograph 100.

(7) Correspondences Between Constituent Elements in Claims and Parts in Preferred Embodiments In the following paragraphs, non-limiting examples of correspondences between various elements recited in the claims below and those described above with respect to various preferred embodiments of the present disclosure are explained. In the above embodiment, the eluate flow path 522 is an example of a first flow path, the regeneration liquid flow paths 523A, 523B are examples of a second flow path, the flow paths p0*a*, p0*b* are examples of a first supply path, the flow path p1 is an example of a second supply path, the flow path p5 is an example of a first discharge path, the flow path p6 is an example of a second discharge path and the flow path p7 is an example of a third discharge path. Further, the flow sensor 51*a* is an example of a first flow sensor, and the flow sensor 51*b* is an example of a second flow sensor. Further, the threshold value Th1 is an example of a predetermined first threshold value, the threshold value Th2 is an example of a predetermined second threshold value, the pressure threshold value PTh is an example of a predetermined third threshold value, and the flow rate threshold value FTh is an example of a predetermined fourth threshold value. Further, the detection signal FS1 is an example of a first detection signal, the detection signal FS2 is an example of a second detection signal, the ON state is an example of a first state and a third state, the OFF state is an example of a second state and a fourth state, the regeneration liquid supplier 80 is an example of the supplier, and the system controller 110 is an example of first and second controllers.

(8) Aspects (Item 1) A suppressor device for an ion chromatograph according to one aspect is provided between a separation column and a detector of an ion chromatograph, and may include an electrodialysis suppressor that includes a first flow path to which an eluate flowing from the separation column is supplied, a second flow path to which a regeneration liquid is supplied and an ion exchange membrane provided between the first flow path and the second flow path and an electrode to which a voltage is applied, and a power supply circuit that applies a voltage to the electrode, wherein the power supply circuit may be turned off in a case in which an eluate is not supplied to the first flow path of the electrodialysis suppressor.

With the suppressor device for an ion chromatograph according to item 1, in a case in which an eluate is not supplied to the first flow path, a voltage is not applied to the electrode of the suppressor. Therefore, a voltage is prevented from being applied with an eluate staying in the first flow path of the suppressor. Thus, because Joule heat caused by electricity distribution is not generated, the temperature in the first flow path does not increase. Therefore, the concentration of ions in the eluate in the first flow path does not increase excessively. As a result, the structures in the suppressor can be prevented from being deteriorated and damaged.

(Item 2) The suppressor device for an ion chromatograph, according to item 1 may further include a first flow sensor that detects a flow rate of an eluate supplied to the first flow path of the electrodialysis suppressor, wherein the power supply circuit may be configured to be turned off in a case in which a flow rate detected by the first flow sensor is equal to or smaller than a predetermined first threshold value.

With the suppressor device for an ion chromatograph according to item 2, in a case in which a flow rate detected by the first flow sensor is equal to or smaller than a predetermined first threshold value, a voltage is not applied to the electrode of the suppressor. Therefore, a voltage is prevented from being applied with an eluate staying in the first flow path of the suppressor.

(Item 3) The suppressor device for an ion chromatograph, according to item 2, wherein the power supply circuit may be configured to be turned on in a case in which a flow rate detected by the first flow sensor is larger than a predetermined first threshold value.

With the suppressor device for an ion chromatograph according to item 3, the power supply circuit is turned on in conjunction with a flow of an eluate in the first flow path of the suppressor. In this case, a situation where a voltage is not applied when an eluate is flowing through the first flow path does not occur. This prevents ions in the eluate from accumulating in the suppressor without being electrodialyzed. Thus, a period of time required to remove ions accumulated in the suppressor is reduced. As a result, the baseline of a value of detection by the detector is stabilized in a short period of time.

(Item 4) The suppressor device for an ion chromatograph, according to item 2 or 3, wherein the first flow sensor may output a first detection signal indicating a flow rate of an eluate supplied to the first flow path, the suppressor device for an ion chromatograph may further include a determination circuit that determines whether a flow rate indicated by a first detection signal provided from the first flow sensor is larger than the first threshold value and outputs a determination signal indicating a result of determination, the determination signal may be in a first state in a case in which a flow rate indicated by the first detection signal is larger than the first threshold value, and may be in a second state in a case in which a flow rate indicated by the first detection signal is equal to or smaller than the first threshold value, and the power supply circuit may be turned on in a case in which the determination signal is in the first state, and may be turned off in a case in which the determination signal is in the second state.

With the suppressor device for an ion chromatograph according to item 4, the determination circuit determines whether a flow rate indicated by a first detection signal provided from the first flow sensor is larger than the first threshold value, and outputs a determination signal indicating a result of determination. The power supply circuit is turned on or off based on a state of the determination signal. In this case, the power supply circuit can be turned on and off with a simple configuration.

(Item 5) The suppressor device for an ion chromatograph, according to item 2, wherein the suppressor may be connected to the detector, such that an eluate discharged from the first flow path of the suppressor is supplied to the detector and an eluate discharged from the detector is supplied to the second flow path of the suppressor as the regeneration liquid, the suppressor device for an ion chromatograph may further include a second flow sensor that detects a flow rate of the regeneration liquid supplied from the detector to the second flow path, and the power supply circuit may be configured to be turned on in a case in which a condition that a flow rate detected by the first flow sensor is larger than the first threshold value and a flow rate detected by the second flow sensor is larger than a predetermined second threshold value is satisfied, and may be configured to be turned off in a case in which the condition is not satisfied.

With the suppressor device for an ion chromatograph according to item 5, an eluate discharged from the first flow path of the suppressor is supplied to the detector, and an eluate discharged from the detector is supplied to the second flow path of the suppressor as a regeneration liquid.

In such a configuration, even in a case in which a flow rate detected by the second flow sensor is equal to or smaller than the second threshold value, a voltage is not applied to the electrode of the suppressor. Therefore, a voltage is prevented from being applied with an eluate staying in the second flow path of the suppressor. Thus, because Joule heat caused by electricity distribution is not generated, the temperature in the first flow path does not increase. Therefore, the concentration of ions in a regeneration liquid in the second flow path does not increase excessively. As a result, the structures in the suppressor can be prevented from being deteriorated and damaged.

Further, the power supply circuit is turned on in conjunction with a flow of an eluate in the first flow path of the suppressor and a flow of a regeneration liquid in the second flow path. In this case, a situation where a voltage is not applied when an eluate is flowing through the first flow path and a regeneration liquid is flowing through the second flow path does not occur. This prevents ions in an eluate or ions in a regeneration liquid from accumulating in the suppressor without being electrodialyzed. Thus, a period of time required to remove ions accumulated in the suppressor is reduced. As a result, the baseline of a value of detection by the detector is stabilized in a short period of time.

(Item 6) The suppressor for an ion chromatograph, according to item 2, may further include a supplier configured to supply the regeneration liquid to the second flow path of the suppressor, and a second flow sensor that detects a flow rate of the regeneration liquid supplied from the detector to the second flow path, wherein the power supply circuit may be configured to be turned on in a case in which a condition that a flow rate detected by the first flow sensor is larger than the first threshold value and a flow rate detected by the second flow sensor is larger than a predetermined second threshold value is satisfied, and may be configured to be turned off in a case in which the condition is not satisfied.

With the suppressor device for an ion chromatograph according to item 6, a regeneration liquid is supplied to the second flow path by the supplier. In such a configuration, even in a case in which a flow rate detected by the second flow sensor is equal to or smaller than the second threshold value, a voltage is not applied to the electrode of the suppressor. Therefore, a voltage is prevented from being applied with an eluate staying in the second flow path of the suppressor. Thus, because Joule heat caused by electricity distribution is not generated, the temperature in the first flow path does not increase. Therefore, the concentration of ions in a regeneration liquid in the second flow path does not increase excessively. As a result, the structures in the suppressor can be prevented from being deteriorated and damaged.

Further, the power supply circuit is turned on in conjunction with a flow of an eluate in the first flow path of the suppressor and a flow of a regeneration liquid in the second flow path. In this case, a situation where a voltage is not applied when an eluate is flowing through the first flow path and a regeneration liquid is flowing through the second flow path does not occur. This prevents ions in an eluate or ions in a regeneration liquid from accumulating in the suppressor without being electrodialyzed. Thus, a period of time required to remove ions accumulated in the suppressor is reduced. As a result, the baseline of a value of detection by the detector is stabilized in a short period of time.

(Item 7) The suppressor device for an ion chromatograph, according to item 5 or 6, wherein the first flow sensor may output a first detection signal indicating a flow rate of an eluate supplied to the first flow path, and the second flow sensor may output a second detection signal indicating a flow rate of a regeneration liquid supplied to the second flow path, the suppressor device for an ion chromatograph may further include a determination circuit that determines whether the condition is satisfied based on the first and second detection signals and outputs a determination signal indicating a result of determination, the determination signal may be put in a third state in a case in which the condition is satisfied, and may be put in a fourth state in a case in which the condition is not satisfied, and the power supply circuit may be turned on in a case in which the determination signal is in the third state, and is turned off in a case in which the determination signal is in the fourth state.

With the suppressor device for an ion chromatograph according to item 7, the determination circuit determines whether a condition that a flow rate indicated by the first detection signal provided from the first flow sensor is larger than the first threshold value and a flow rate indicated by the second detection signal provided from the second flow sensor is larger than the second threshold value is satisfied, and outputs the determination signal indicating a result of determination. The power supply circuit is turned on or off based on a state of a determination signal. In this case, the power supply circuit can be turned on and off with a simple configuration.

(Item 8) The suppressor device for an ion chromatograph, according to any one of items 1 to 7, wherein the ion chromatograph may include a first supply path that supplies an eluent to the separation column, and the suppressor device for an ion chromatograph may further include a first controller that acquires information representing whether an eluent is supplied to the first supply path as first supply information and may turn off the power supply circuit in a case in which the first supply information represents that an eluent is not being supplied to the first supply path.

With the suppressor device for an ion chromatograph according to item 8, in a case in which an eluate is not supplied to the first flow path, a new eluate is not guided to the first flow path of the suppressor. In this case, the first controller turns off the power supply circuit. Thus, a voltage is not applied to the electrode of the suppressor. Therefore, a voltage is prevented from being applied with an eluate staying in the first flow path of the suppressor.

(Item 9) The suppressor device for an ion chromatograph, according to item 8, wherein the ion chromatograph may include a pump that sucks an eluent, the pump may be configured to be selectively switchable between a fifth state in which an eluent is discharged to the first supply path and a sixth state in which an eluent is discharged to a first discharge path different from the first supply path, the first supply information may include first flow path switching information representing which one of the fifth state and the sixth state the pump is switched to, and the first controller may turn off the power supply circuit in a case in which the first flow path switching information represents that the pump is switched to the sixth state.

With the suppressor device for an ion chromatograph according to item 9, in a case in which the pump is in the fifth state, an eluent discharged from the pump is guided to the first flow path of the suppressor through the first supply path and the separation column. On the other hand, in a case in which the pump is in the sixth state, an eluent is discharged from the pump to the first discharge path. Therefore, in a case in which the pump is in the sixth state, a new eluent is not guided to the first flow path of the suppressor. In this case, the first controller turns off the power supply circuit. Thus, a voltage is not applied to the electrode of the suppressor. Therefore, a voltage is prevented from being applied with an eluate staying in the first flow path of the suppressor.

(Item 10) The suppressor device for an ion chromatograph, according to item 9, wherein the first supply information may include pressure information representing a pressure of an eluent discharged to the first supply path, and the first controller may turn off the power supply circuit in a case in which the pressure information represents a value smaller than a predetermined third threshold value.

With the suppressor device for an ion chromatograph according to item 10, in a case in which the pressure of an eluate discharged to the first flow path is smaller than the third threshold value, a sufficient amount of eluate is not guided to the first flow path of the suppressor. In this case, the power supply circuit is turned off. Thus, a voltage is not applied to the electrode of the suppressor. Therefore, a voltage is prevented from being applied with an eluate staying in the first flow path of the suppressor.

(Item 11) The suppressor device for an ion chromatograph, according to item 9 or 10, wherein the first supply information may include flow rate information representing a flow rate of an eluent discharged to the first supply path, and the first controller may turn off the power supply circuit in a case in which the flow rate information represents a value smaller than a predetermined fourth threshold value.

With the suppressor device for an ion chromatograph according to item 11, in a case in which a flow rate of an eluent discharged to the first supply path is smaller than the fourth threshold value, a sufficient amount of eluate is not guided to the first flow path of the suppressor. In this case, the power supply circuit is turned off. Thus, a voltage is not applied to the electrode of the suppressor. Therefore, a voltage is prevented from being applied with an eluate staying in the first flow path of the suppressor.

(Item 12) The suppressor device for an ion chromatograph, according to any one of items 8 to 11, wherein the ion chromatograph may further include a sample introducer that introduces a sample to an eluent, the sample introducer may be configured to be selectively switchable between a seventh state in which an eluent is led out to the first supply path and a eighth state in which an eluent is led out to a second discharge path different from the first supply path, the first supply information may include second flow path switching information representing which one of the seventh state and the eighth state the sample introducer is switched to, and the first controller may turn off the power supply circuit in a case in which the second flow path switching information represents that the sample introducer is switched to the eighth state.

With the suppressor device for an ion chromatograph according to item 12, in a case in which the sample introducer is in the seventh state, an eluent discharged from the sample introducer is guided to the first flow path of the suppressor through the first supply path and the separation column. On the other hand, in a case in which the sample introducer is in the eighth state, an eluent is led out from the sample introducer to the second discharge path. Therefore, in a case in which the sample introducer is in the eighth state, an eluent is not guided to the first flow path of the suppressor. At this time, the first controller turns off the power supply circuit. Thus, a voltage is not applied to the electrode of the suppressor. Therefore, a voltage is prevented from being applied with an eluate staying in the first flow path of the suppressor.

(Item 13) The suppressor device for an ion chromatograph, according to any one of items 1 to 12, wherein the ion chromatograph may include a second supply path that supplies an eluate led out from the separation column to the first flow path of the suppressor, and the suppressor device for an ion chromatograph may further include a second controller that acquires information representing whether an eluent is supplied to the second supply path as second supply information, and turns off the power supply circuit in a case in which the second supply information represents that an eluent is not supplied to the second supply path.

With the suppressor device for an ion chromatograph according to item 13, in a case in which an eluate is not supplied to the second flow path, a new eluate is not guided to the first flow path of the suppressor. In this case, the second controller turns off the power supply circuit. Thus, a voltage is not applied to the electrode of the suppressor. Therefore, a voltage is prevented from being applied with an eluate staying in the first flow path of the suppressor.

(Item 14) The suppressor device for an ion chromatograph according to item 13, wherein the ion chromatograph may include a switching valve, the switching valve may have a first liquid outlet port from which an eluate led out from the separation column flows out to the second supply path, and a second liquid outlet port from which an eluate led out from the separation column flows out to a third discharge path different from the second supply path, and may be configured to be selectively switchable to either a ninth state in which an eluate flows out from the first liquid outlet port and a tenth state in which an eluate flows out from the second liquid outlet port, the second supply information may include third flow path switching information representing which one of the ninth state and the tenth state the switching value is switched to, and the second controller may turn off the power supply circuit in a case in which the third flow path switching information represents that the switching valve is switched to the tenth state.

With the suppressor device for an ion chromatograph according to item 14, in a case in which the switching valve is in the ninth state, an eluate flowing out from the first liquid outlet port is guided to the first flow path of the suppressor through the second supply path. On the other hand, in a case in which the switching valve is in the tenth state, an eluate flows out from the second liquid outlet port to the third discharge path. Therefore, in a case in which the switching valve is in the tenth state, a new eluate is not guided to the first flow path of the suppressor. In this case, the first controller turns off the power supply circuit. Thus, a voltage is not applied to the electrode of the suppressor. As a result, a voltage is prevented from being applied with an eluate staying in the first flow path of the suppressor.

The invention claimed is:
1. A suppressor device for an ion chromatograph, provided between a separation column and a detector of an ion chromatograph, comprising:
    an electrodialysis suppressor that includes a first flow path to which an eluate flowing from the separation column is supplied, a second flow path to which a regeneration liquid is supplied and an ion exchange membrane provided between the first flow path and the second flow path and an electrode to which a voltage is applied; and a power supply circuit that applies a voltage to the electrode, wherein
the power supply circuit is turned off in a case in which it is detected that the
eluate is not supplied to the first flow path of the electrodialysis suppressor.

2. The suppressor device for an ion chromatograph, according to claim 1, further comprising a first flow sensor that detects a flow rate of the eluate supplied to the first flow path of the electrodialysis suppressor, wherein
the power supply circuit is configured to be turned off in a case in which the flow rate detected by the first flow sensor is equal to or smaller than a predetermined first threshold value.

3. The suppressor device for an ion chromatograph, according to claim 2, wherein
the power supply circuit is configured to be turned on in a case in which the flow rate detected by the first flow sensor is larger than a predetermined first threshold value.

4. The suppressor device for an ion chromatograph, according to claim 2, wherein
the first flow sensor outputs a first detection signal indicating the flow rate of the eluate supplied to the first flow path,
the suppressor device for an ion chromatograph further includes a determination circuit that determines whether the flow rate indicated by the first detection signal provided from the first flow sensor is larger than the first threshold value and outputs a determination signal indicating a result of determination,
the determination signal is in a first state in a case in which the flow rate indicated by the first detection signal is larger than the first threshold value, and is in a second state in a case in which the flow rate indicated by the first detection signal is equal to or smaller than the first threshold value, and
the power supply circuit is turned on in a case in which the determination signal is in the first state, and is turned off in a case in which the determination signal is in the second state.

5. The suppressor device for an ion chromatograph, according to claim 2, wherein
the electrodialysis suppressor is connected to the detector, such that the eluate discharged from the first flow path of the electrodialysis suppressor is supplied to the detector and the eluate discharged from the detector is supplied to the second flow path of the electrodialysis suppressor as the regeneration liquid,
the suppressor device for an ion chromatograph further includes a second flow sensor that detects a flow rate of the regeneration liquid supplied from the detector to the second flow path, and
the power supply circuit is configured to be turned on in a case in which a condition that a flow rate detected by the first flow sensor is larger than the first threshold value and a flow rate detected by the second flow sensor is larger than a predetermined second threshold value is satisfied, and is configured to be turned off in a case in which the condition is not satisfied.

6. The suppressor device for an ion chromatograph, according to claim 5, wherein
the first flow sensor outputs a first detection signal indicating the flow rate of the eluate supplied to the first flow path, and the second flow sensor outputs a second detection signal indicating the flow rate of the regeneration liquid supplied to the second flow path,
the suppressor device for an ion chromatograph further includes a determination circuit that determines whether the condition is satisfied based on the first and second detection signals and outputs a determination signal indicating a result of determination,
the determination signal is put in a third state in a case in which the condition is satisfied, and is put in a fourth state in a case in which the condition is not satisfied, and
the power supply circuit is turned on in a case in which the determination signal is in the third state, and is turned off in a case in which the determination signal is in the fourth state.

7. The suppressor for an ion chromatograph, according to claim 2, further comprising:
a supplier configured to supply the regeneration liquid to the second flow path of the electrodialysis suppressor; and
a second flow sensor that detects a flow rate of the regeneration liquid supplied from the detector to the second flow path, wherein
the power supply circuit is configured to be turned on in a case in which a condition that the flow rate detected by the first flow sensor is larger than the first threshold value and the flow rate detected by the second flow sensor is larger than a predetermined second threshold value is satisfied, and is configured to be turned off in a case in which the condition is not satisfied.

8. The suppressor device for an ion chromatograph, according to claim 1, wherein
the ion chromatograph includes a first supply path that supplies an eluent to the separation column, and
the suppressor device for an ion chromatograph further includes a first controller that acquires information representing whether the eluent is supplied to the first supply path as first supply information and turns off the power supply circuit in a case in which the first supply information represents that an eluent is not being supplied to the first supply path.

9. The suppressor device for an ion chromatograph, according to claim 8, wherein
the ion chromatograph includes a pump that sucks the eluent,
the pump is configured to be selectively switchable between a fifth state in which an eluent is discharged to the first supply path and a sixth state in which the eluent is discharged to a first discharge path different from the first supply path,
the first supply information includes first flow path switching information representing which one of the fifth state and the sixth state the pump is switched to, and
the first controller turns off the power supply circuit in a case in which the first flow path switching information represents that the pump is switched to the sixth state.

10. The suppressor device for an ion chromatograph, according to claim 9, wherein
the first supply information includes pressure information representing a pressure of the eluent discharged to the first supply path, and
the first controller turns off the power supply circuit in a case in which the pressure information represents a value smaller than a predetermined third threshold value.

11. The suppressor device for an ion chromatograph, according to claim 9, wherein
the first supply information includes flow rate information representing a flow rate of the eluent discharged to the first supply path, and
the first controller turns off the power supply circuit in a case in which the flow rate information represents a value smaller than a predetermined fourth threshold value.

12. The suppressor device for an ion chromatograph, according to claim 8, wherein
the ion chromatograph further includes a sample introducer that introduces a sample to the eluent,
the sample introducer is configured to be selectively switchable between a seventh state in which the eluent is led out to the first supply path and a eighth state in which the eluent is led out to a second discharge path different from the first supply path,
the first supply information includes second flow path switching information representing which one of the seventh state and the eighth state the sample introducer is switched to, and
the first controller turns off the power supply circuit in a case in which the second flow path switching information represents that the sample introducer is switched to the eighth state.

13. The suppressor device for an ion chromatograph, according to claim 1, wherein
the ion chromatograph includes a second supply path that supplies the eluate led out from the separation column to the first flow path of the suppressor, and
the suppressor device for an ion chromatograph further includes a second controller that acquires information representing whether the eluate is supplied to the second supply path as second supply information, and turns off the power supply circuit in a case in which the second supply information represents that the eluate is not supplied to the second supply path.

14. The suppressor device for an ion chromatograph according to claim 13, wherein
the ion chromatograph includes a switching valve,
the switching valve
has
a first liquid outlet port from which the eluate led out from the separation column flows out to the second supply path, and
a second liquid outlet port from which the eluate led out from the separation column flows out to a third discharge path different from the second supply path, and
is configured to be selectively switchable to either a ninth state in which the eluate flows out from the first liquid outlet port and a tenth state in which the eluate flows out from the second liquid outlet port,
the second supply information includes third flow path switching information representing which one of the ninth state and the tenth state the switching value is switched to, and
the second controller turns off the power supply circuit in a case in which the third flow path switching information represents that the switching valve is switched to the tenth state.

* * * * *